(12) United States Patent
Chang

(10) Patent No.: US 10,039,952 B2
(45) Date of Patent: Aug. 7, 2018

(54) TREADMILL HAVING A CURVED TREADMILL DECK

(71) Applicant: Chung-Fu Chang, Changhua County (TW)

(72) Inventor: Chung-Fu Chang, Changhua County (TW)

( * ) Notice: Subject to any disclaimer, the term of this patent is extended or adjusted under 35 U.S.C. 154(b) by 0 days.

(21) Appl. No.: 15/490,310

(22) Filed: Apr. 18, 2017

(65) Prior Publication Data

US 2017/0340917 A1    Nov. 30, 2017

(30) Foreign Application Priority Data

May 27, 2016  (TW) .................................. 105208027

(51) Int. Cl.
*A63B 22/02*  (2006.01)

(52) U.S. Cl.
CPC ................................ *A63B 22/0285* (2013.01)

(58) Field of Classification Search
CPC ....... A63B 2/00; A63B 22/02; A63B 22/0235; A63B 22/0242; A63B 22/0257; A63B 22/0285
See application file for complete search history.

(56) References Cited

U.S. PATENT DOCUMENTS

| | | | | |
|---|---|---|---|---|
| 3,642,279 A | * | 2/1972 | Cutter | A63B 22/02 482/54 |
| 3,941,377 A | * | 3/1976 | Lie | A63B 22/0012 482/51 |
| 4,334,676 A | * | 6/1982 | Schonenberger | A63B 22/02 482/54 |
| 4,509,510 A | * | 4/1985 | Hook | A61H 7/001 156/292 |
| 4,925,183 A | * | 5/1990 | Kim | A63B 22/16 434/61 |
| 5,158,073 A | * | 10/1992 | Bukowski | A61H 39/04 5/944 |
| 5,250,067 A | * | 10/1993 | Gelfer | A61H 39/00 606/185 |
| 5,391,129 A | * | 2/1995 | Zaitsev | A63B 23/03533 482/142 |
| 5,470,293 A | * | 11/1995 | Schonenberger | A63B 22/02 198/834 |
| 5,527,241 A | * | 6/1996 | Peng | A61H 7/001 482/51 |

(Continued)

*Primary Examiner* — Garrett Atkinson
(74) *Attorney, Agent, or Firm* — Jackson IPG PLLC; Demian K. Jackson

(57) ABSTRACT

A treadmill having a curved treadmill deck is provided. Two curved side frames are disposed at two sides of the treadmill frame. Front and rear end ends of each curved side frame are higher than a middle section thereof. Inner sides of the two curved side frames are provided with a plurality of fixing seats, respectively. The fixing seats have fixing holes, respectively. An elastic deck is composed of a plurality of sheets connected side by side. The sheets each have perforations corresponding in position to the fixing holes of the respective fixing seats. A plurality of fixing pins are inserted in the perforations of the sheets of the elastic deck and secured to the fixing holes of the fixing seats. The elastic deck is forcibly fastened by the fixing pins and slightly deformed according to the curvature of the curved side frames to form the curved treadmill deck.

10 Claims, 12 Drawing Sheets

(56) References Cited

U.S. PATENT DOCUMENTS

| | | | | |
|---|---|---|---|---|
| 5,586,961 | A * | 12/1996 | Quint | A63B 22/02 482/111 |
| 5,690,587 | A * | 11/1997 | Gruenangerl | A63B 22/02 482/54 |
| 5,709,632 | A * | 1/1998 | Socwell | A63B 22/0012 482/51 |
| 5,897,461 | A * | 4/1999 | Socwell | A63B 22/0012 482/54 |
| 6,053,848 | A * | 4/2000 | Eschenbach | A63B 22/02 482/51 |
| 6,162,150 | A * | 12/2000 | Lee | A63B 23/03533 482/51 |
| 6,860,836 | B1 * | 3/2005 | Wu | A63B 22/001 198/850 |
| 6,918,859 | B1 * | 7/2005 | Yeh | A61H 7/001 482/54 |
| 7,195,582 | B2 * | 3/2007 | Wu | A63B 22/001 198/850 |
| 7,294,093 | B2 * | 11/2007 | Stafiej | A63B 69/18 482/51 |
| 7,510,511 | B2 * | 3/2009 | von Detten | A63B 22/02 482/54 |
| 7,976,437 | B1 * | 7/2011 | von Detten | A63B 22/0235 482/54 |
| D723,636 | S * | 3/2015 | Kahmann | A63B 22/04 D21/668 |
| 9,675,839 | B2 * | 6/2017 | Dalebout | A63B 22/02 |
| 9,694,234 | B2 * | 7/2017 | Dalebout | A63B 22/02 |
| 2002/0177511 | A1 * | 11/2002 | Jang | A61H 15/00 482/146 |
| 2005/0221959 | A1 * | 10/2005 | Yeh | A61H 7/001 482/54 |
| 2007/0275827 | A1 * | 11/2007 | Glaser | A63B 21/4037 482/23 |
| 2008/0176719 | A1 * | 7/2008 | To | A63B 22/0235 482/54 |
| 2009/0170666 | A1 * | 7/2009 | Chiang | A63B 22/02 482/54 |
| 2016/0144225 | A1 * | 5/2016 | Dalebout | A63B 22/02 482/54 |

* cited by examiner

TREADMILL HAVING A CURVED TREADMILL DECK

FIELD OF THE INVENTION

The present invention relates to a treadmill, and more particularly to a treadmill having a curved treadmill deck.

BACKGROUND OF THE INVENTION

In order to make the user easily tread the treadmill belt and push the treadmill belt rearward to achieve a labor-saving effect, the manufacturing process of the existing curved treadmill deck is complicated. It is formed by gluing multiple layers of thin boards to a certain thickness to form a flat deck, and then the flat deck is heated and pressed by a large-sized oil hydraulic press to form a curved treadmill deck with a mold. However, the process of the molding needs time, so the piece of work is rather time-consuming. Besides, the arc angle must be a certain angle for the curved treadmill deck to be mounted to a specific curved side frame. If the curved side frames at both sides of the treadmill are slightly asymmetric, the assembly is quite troublesome. Because the curved treadmill deck has been hardened and shaped, it is necessary to adjust the position of the fixing seat of the curved side frame. This is quite time-consuming.

The aforementioned hardened treadmill deck cannot achieve a buffer effect, and is likely to cause harm to the knee of the user. A buffer mechanism may be used to remedy the defect. However, the buffer mechanism will have a rebound effect when the user lifts his/her feet, which may directly hurt the ankle or knee. Because the feet bear the weight of the body, the reaction force is large. The buffer mechanism functioning as a buffer is not beneficial for the feet, and it may harm the feet. Accordingly, the inventor of the present invention has devoted himself based on his many years of practical experiences to solve these problems.

SUMMARY OF THE INVENTION

In view of the shortcoming of the prior art, the primary object of the present invention is to provide a treadmill having a curved treadmill deck. Two curved side frames are disposed at two sides of a treadmill frame. Front and rear end ends of each curved side frame are higher than a middle section thereof. Inner sides of the two curved side frames are provided with a plurality of fixing seats, respectively. The fixing seats have fixing holes, respectively. An elastic deck is composed of a plurality of sheets connected side by side. Two ends of each sheet have perforations corresponding in position to the fixing holes of the respective fixing seats of the curved side frames. A plurality of fixing pins are inserted in the perforations of the sheets of the elastic deck and secured to the fixing holes of the fixing seats. The elastic deck is forcibly fastened by the fixing pins and slightly deformed according to the curved shape of the two curved side frames to form the curved treadmill deck. Each sheet of the curved treadmill deck may be made of a flexible glass fiberboard, a flexible bamboo board, a flexible wood board, a flexible plastic board, or a flexible cardboard, reducing the manufacturing time of the curved treadmill deck and providing an appropriate buffer effect for the user.

In order to achieve the aforesaid object, the prevent invention provides a treadmill having a curved treadmill deck. The treadmill comprises a treadmill frame, a front roller, a rear roller, an elastic deck, and an elastic treadmill belt. The treadmill belt is wound around the front roller and the rear roller so that the treadmill belt travels from front to back. The elastic deck is disposed beneath the upper part of the circular treadmill belt. When the user treads the treadmill belt, the gravity falls on the elastic deck. Two curved side frames are disposed at two sides of the treadmill frame. The two curved side frames are parallel to each other and spaced apart from each other. The two curved side frames each have a high front end and a low rear end to form a curved shape. Inner sides of the two curved side frames are provided with a plurality of fixing seats, respectively. The fixing seats have fixing holes, respectively. The fixing holes of the fixing seats of one curved side frame correspond to the fixing holes of the fixing seats of the other curved side frame. The elastic deck includes a plurality of sheets connected side by side. The sheets each have perforations corresponding in position to the fixing holes of the respective fixing seats. A plurality of fixing pins are inserted in the perforations of the elastic deck and secured to the fixing holes of the fixing seats. The elastic deck is forcibly fastened by the fixing pins and slightly deformed according to the curved shape of the two curved side frames to form the curved treadmill deck. An endurable slide plate is attached to the curved treadmill deck and fixed by the fixing pins. The endurable slide corresponds in shape to the curved treadmill deck. Two sides of the elastic deck are forcibly fastened to the fixing seats of the two curved side frames to form the curved treadmill deck, providing a rapid installation and reducing the manufacturing time of the curved treadmill deck. The elastic deck directly forms the curved treadmill deck, having an appropriate buffer effect.

Preferably, the inner sides of the two curved side frames are provided with a plurality of press rods spaced apart from each other for pressing the treadmill belt on the curved treadmill deck so that the treadmill belt is attached to the curved treadmill deck, thereby preventing the treadmill belt from disengaging from the curved treadmill deck in a suspended manner.

In some embodiments, each sheet of the elastic deck is made of one of a flexible glass fiberboard, a flexible bamboo board, a flexible wood board, a flexible plastic board, and a flexible cardboard. The sheets of the elastic deck are forcibly fastened to the respective fixing seats of the two curved side frames to form the curved treadmill deck.

In some embodiments, each sheet of the elastic deck is made of one of a laminated wooden board, a laminated glass fiberboard, a laminated bamboo board, a laminated plastic board, and a laminated cardboard.

In some embodiments, at least one support rod is transversely connected between the two curved side frames, and the support rod is located beneath the curved treadmill deck to support the curved treadmill deck, thereby preventing the curved treadmill deck from being deformed and caved in because of excessive tread.

In some embodiments, each press rod may be a bearing or a roller. An outer edge of the bearing or the roller is covered with a rubber soft layer or a plastic soft layer for reducing the noise when the treadmill belt is running.

In some embodiments, the endurable slide plate is a one-piece plate, and the endurable slide plate corresponding in size to the curved treadmill deck.

In some embodiments, the endurable slide plate is composed of a plurality of plates connected side by side, and the plates of the endurable slide plate correspond in size and in position to the sheets of the elastic deck, respectively.

Preferably, the treadmill further comprises a plurality of fixing members. Each fixing member is one of a tube and a plate. The number of the fixing members corresponds to the number of the perforations. The fixing members correspond in position to the perforations and are secured by the respective fixing pins to press outer side edges of the elastic deck.

Alternatively, the treadmill further comprises two fixing members. Each fixing member is one of an elongate curved tube and an elongate curved plate. The two fixing members are located at two long sides of the elastic deck. The two fastening members correspond to the perforations of the elastic deck and are secured by the fixing pins to press outer side edges of the elastic deck.

DETAILED DESCRIPTION OF THE PREFERRED EMBODIMENTS

Figure 1:
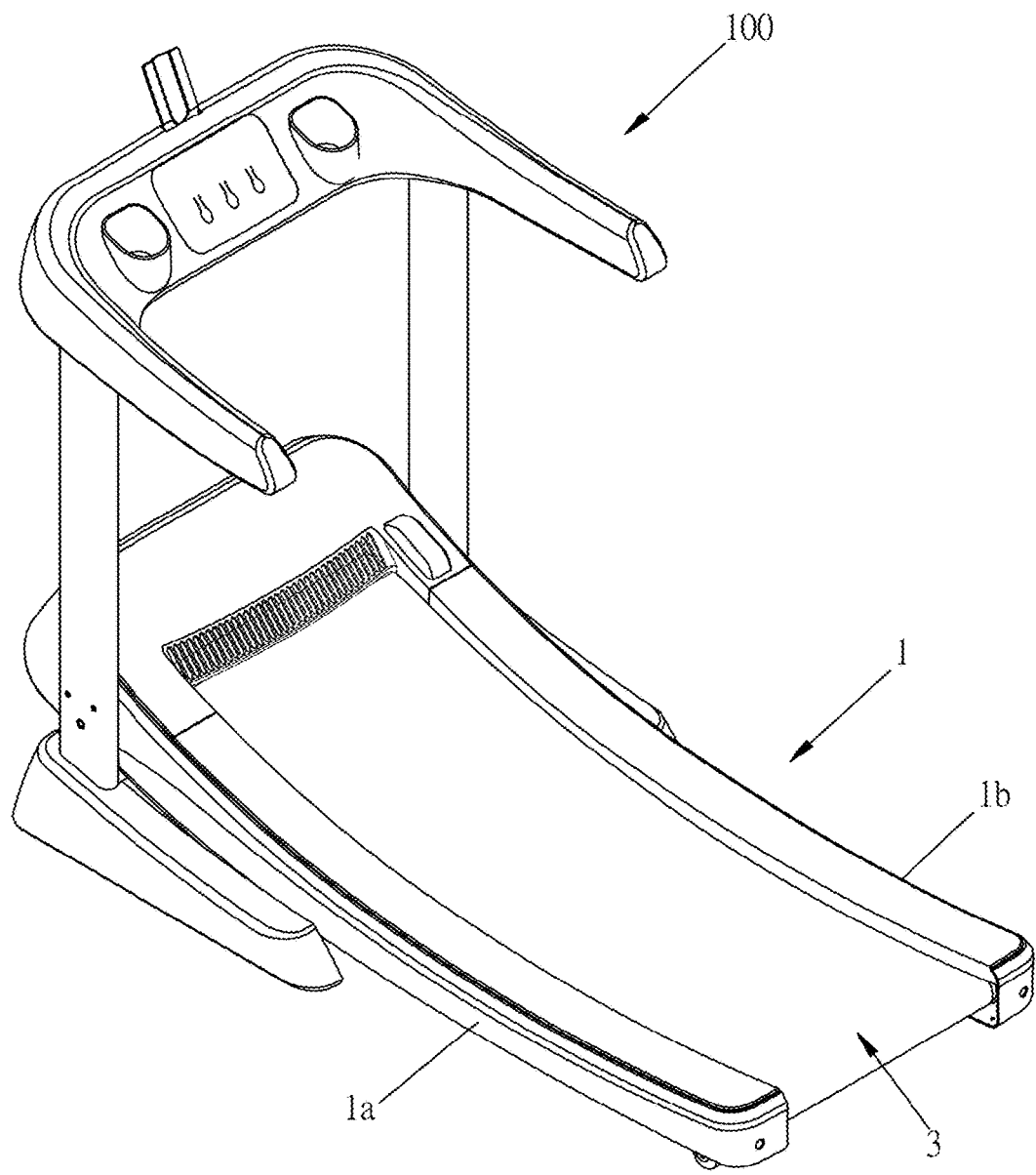
FIG. 1 is a perspective view of the treadmill of the present invention.

Embodiments of the present invention will now be described, by way of example only, with reference to the accompanying drawings.

As shown FIG. 1 to FIG. 5, a treadmill 100 according to a preferred embodiment of the present invention includes a treadmill frame 1, a front roller F, a rear roller B, an elastic deck 2, and an elastic treadmill belt 3. The treadmill belt 3 is wound around the front roller F and the rear roller B so that the treadmill belt 3 travels from front to back. The elastic deck 2 is disposed beneath the upper part of the circular treadmill belt 3. When the user treads the treadmill belt 3, the gravity falls on the elastic deck 2.

Left and right sides of the treadmill frame 1 are provided with two curved side frames 1a, 1b, respectively. The two curved side frames 1a, 1b each have a high front end and a low rear end to from a curved shape. Inner sides of the curved side frames 1a, 1b are provided with a plurality of fixing seats 11a, 11b, respectively. The fixing seats 11a, 11b have fixing holes 111a, 111b, respectively.

The elastic deck 2 is composed of a plurality of sheets 20 connected side by side. The sheets 20 each have perforations 21 corresponding in position to the fixing holes 111a, 111b of the respective fixing seats 11a, 11b.

A plurality of fixing pins 22 are inserted in the perforations 21 of the elastic deck 2 and secured to the fixing holes 111a, 111b of the fixing seats 11a, 11b. The elastic deck 2 is forcibly fastened by the fixing pins 22 and slightly deformed according to the curved shape of the two curved side frames 1a, 1b to form a curved treadmill deck 2a. Two sides of the elastic deck 2 are forcibly fastened to the fixing seats 11a, 11b of the two curved side frames 1a, 1b, so that the respective sheets 20 are naturally connected side by side to form the curved treadmill deck 2a, providing a rapid installation and reducing the manufacturing time of the curved treadmill deck. The elastic deck 2 directly forms the curved treadmill deck 2a, having an appropriate buffer effect.

Figure 2:
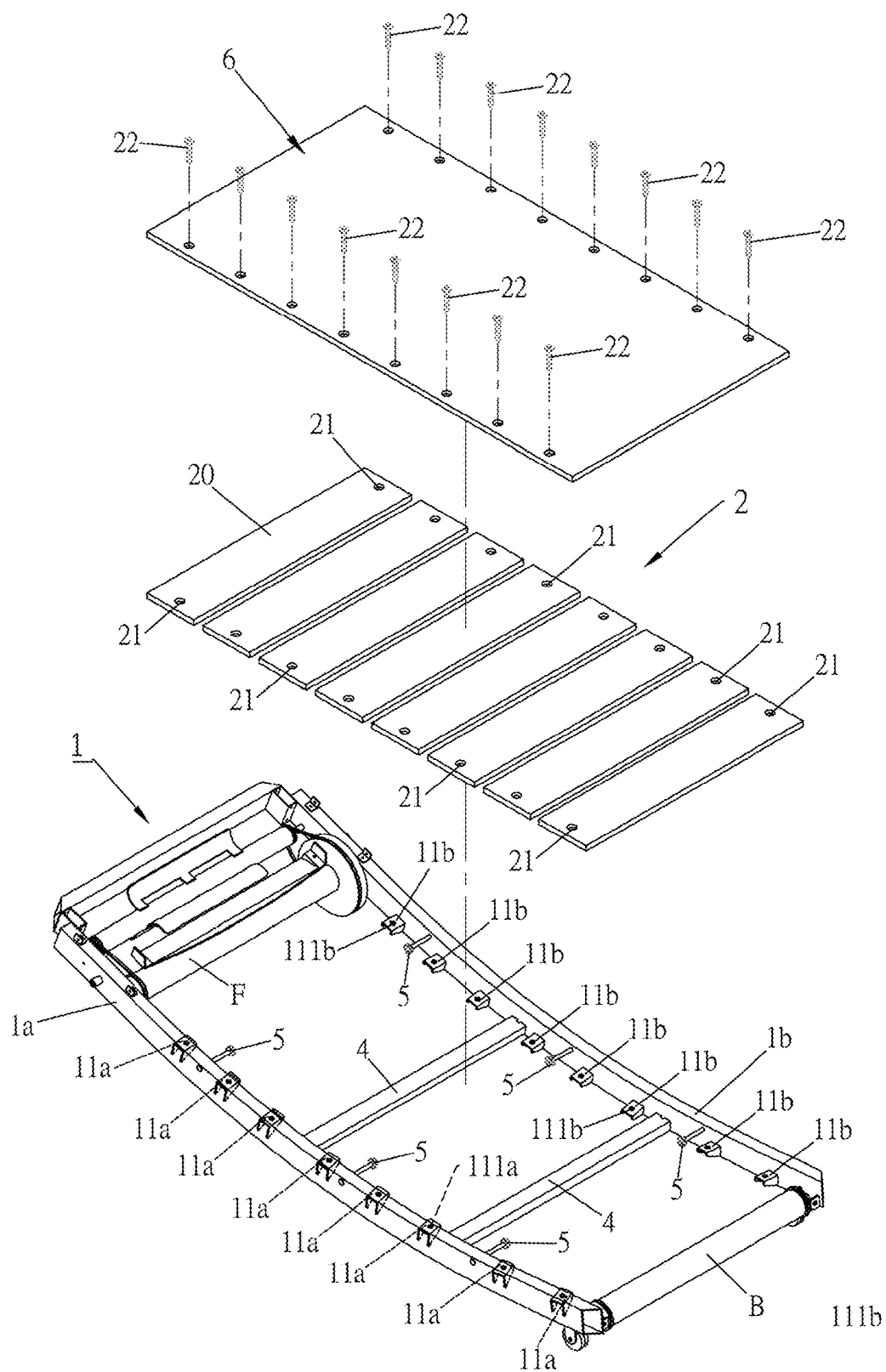
FIG. 2 is an exploded view of the curved treadmill deck of the present invention.
Figure 3:
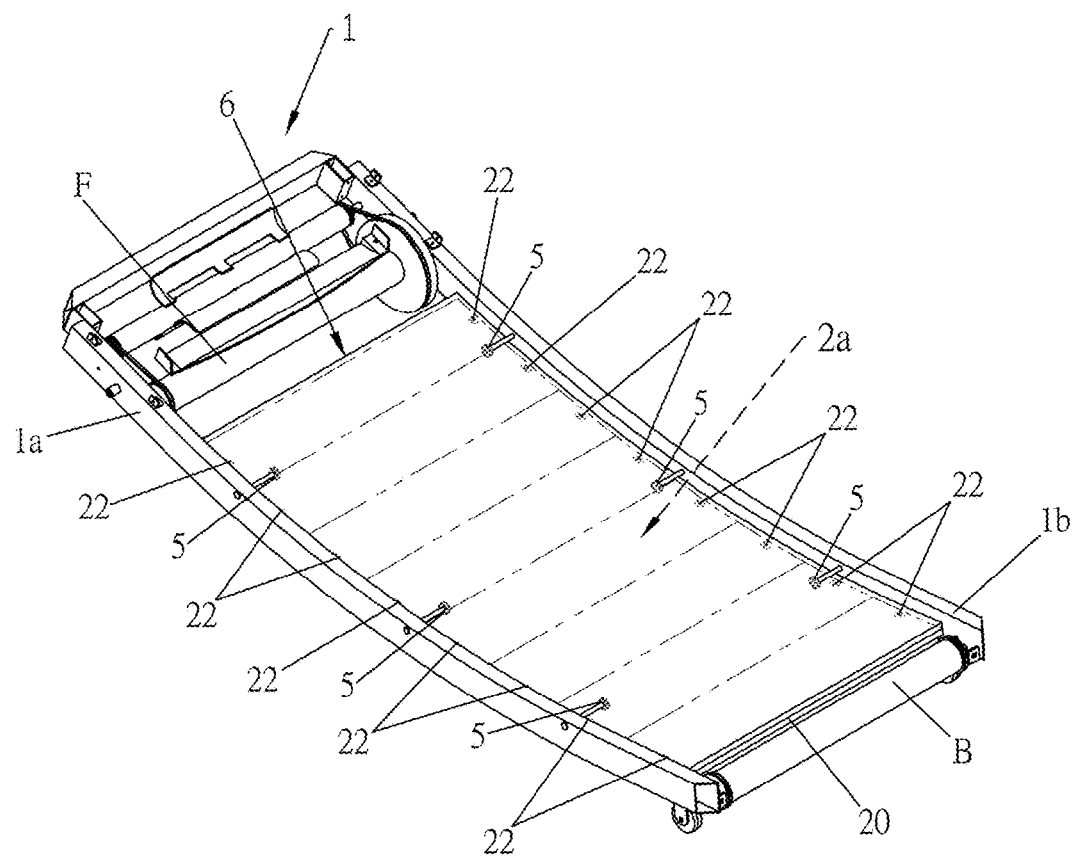
FIG. 3 is a perspective view of the curved treadmill deck of the present invention.
Figure 4:
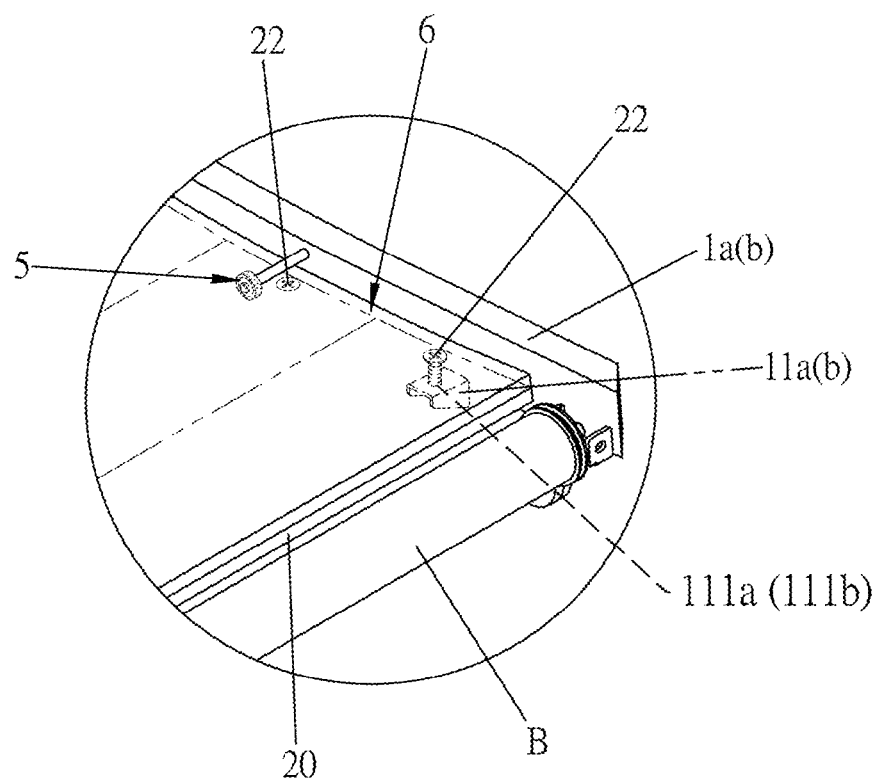
FIG. 4 is a partial enlarged view of the present invention, showing that the fixing pins are used to fasten the curved treadmill deck.
Figure 5:
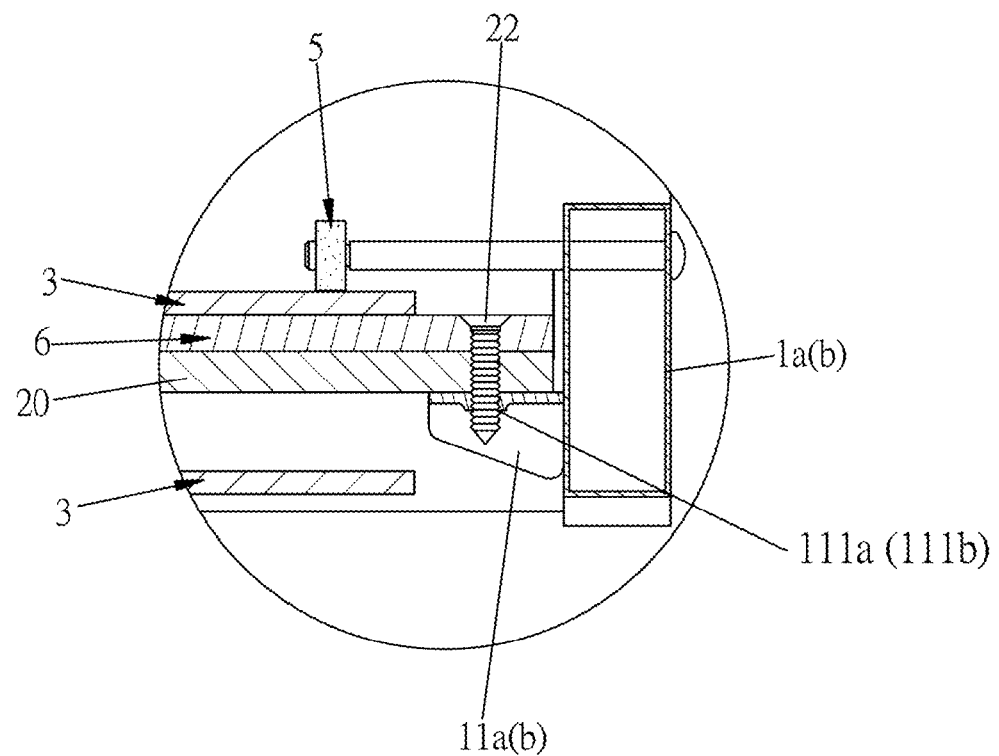
FIG. 5 is a partial sectional view of the present invention, showing that the fixing pins are used to fasten the curved treadmill deck.
Figure 6:
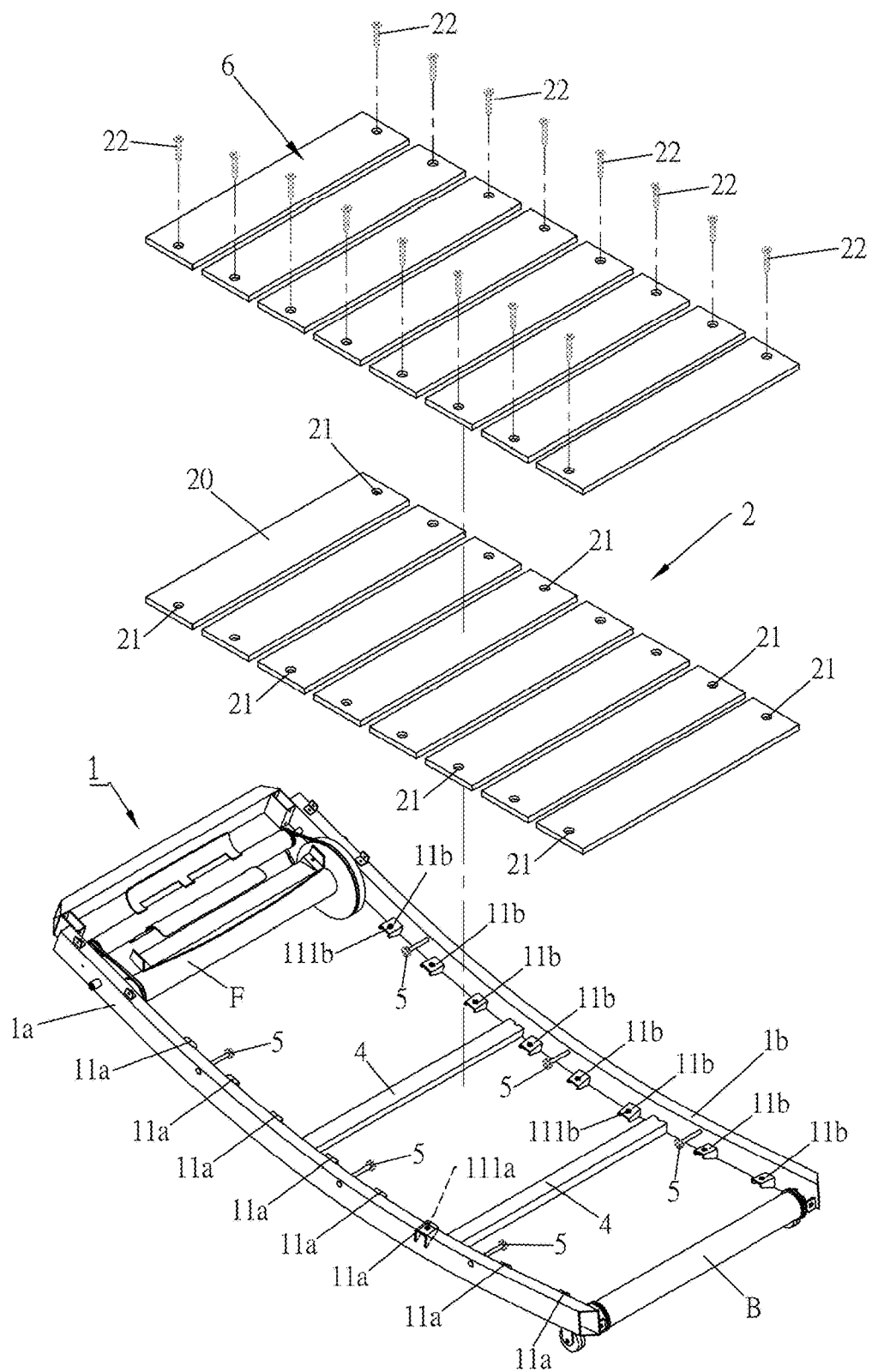
FIG. 6 is an exploded view of the curved treadmill deck of the present invention, showing another embodiment of the endurable slide plate.

An endurable slide plate 6 is attached to the elastic deck 2 and is fixed by the fixing pins 22, and corresponds in shape to the elastic deck 2. The endurable slide plate 6 is a one-piece plate, as shown in FIG. 2. The overall size of the endurable slide plate 6 is the same as that of the elastic deck 2. In another embodiment, the endurable slide plate 6 is composed of a plurality of plates (as shown in FIG. 6) connected side by side. The plates of the endurable slide plate 6 correspond in size and in position to the sheets 20 of the elastic deck 2, respectively.

The elastic deck 2 may be made of a flexible glass fiberboard, a flexible bamboo board, a flexible wood board, a flexible plastic board, or a flexible cardboard, which is forcibly fastened according to the curved side frames 11a, 11b of the treadmill frame 1 to form the curved treadmill deck 2a.

Preferably, each sheet 20 of the elastic deck 2 may be made of a laminated wooden board, a laminated glass fiberboard, a laminated bamboo board, a laminated plastic board, or a laminated cardboard.

Preferably, at least one support rod 4 is transversely connected between the two curved side frames 1a, 1b, and is located beneath the curved treadmill deck 2a to support the curved treadmill deck 2a, thereby preventing the curved treadmill deck 2a from being deformed and caved in because of excessive tread.

Preferably, the inner sides of the two curved side frames 1a, 1b are provided with a plurality of press rods 5 spaced apart from each other for pressing the treadmill belt 3 on the curved treadmill deck 2a, so that the treadmill belt 3 is attached to the curved treadmill deck 2a while the treadmill belt 3 is running. This can prevent the treadmill belt 3 from disengaging from the curved treadmill deck 2a in a suspended manner.

Preferably, each press rod 5 may be a bearing or a roller. An outer edge of the bearing or the roller is covered with a rubber soft layer or a plastic soft layer for reducing the noise when the treadmill belt 3 is running.

Figure 7:
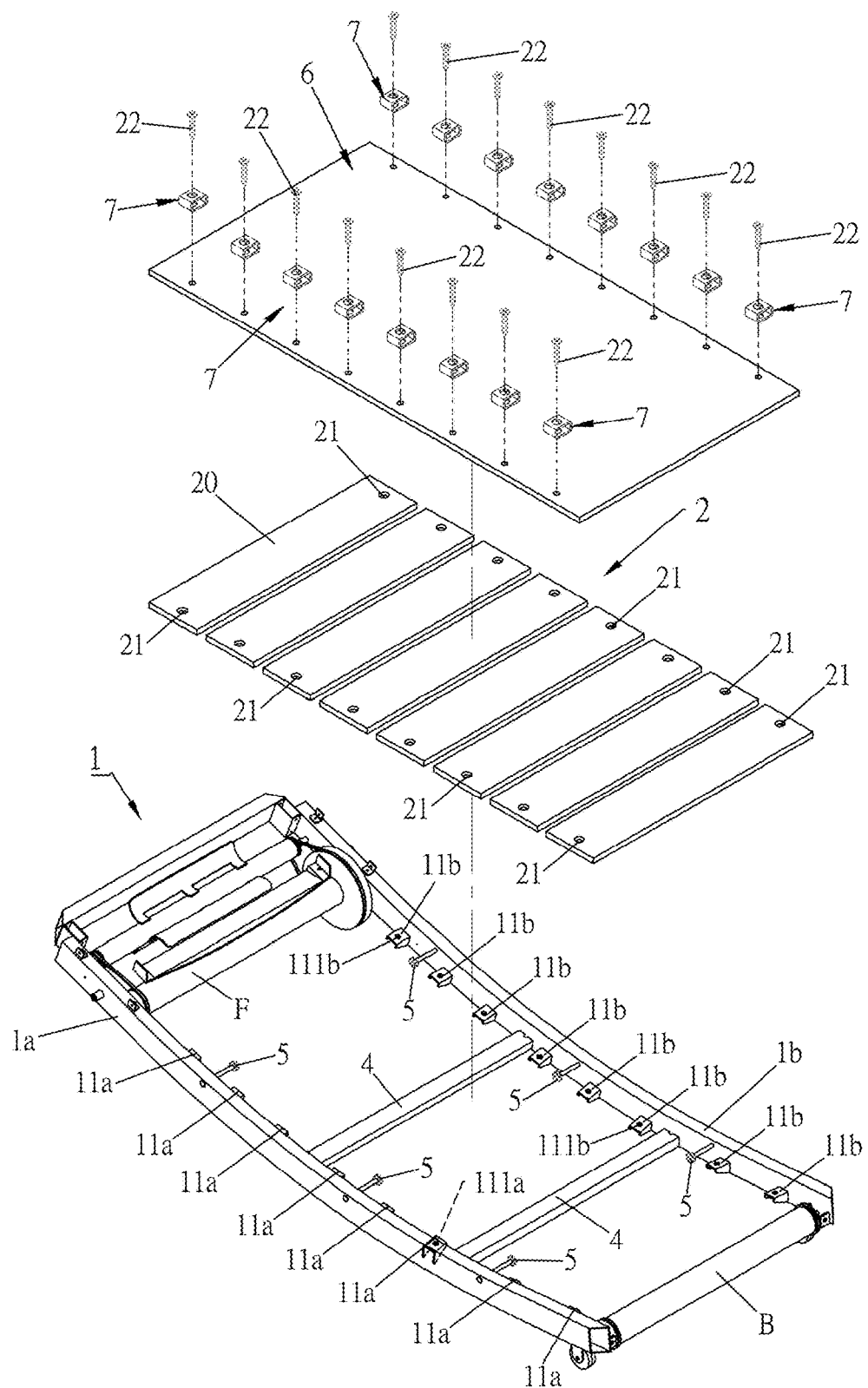
FIG. 7 is an exploded view of the curved treadmill deck of the present invention, showing the fixing members each in the form a tube or a plate to fix two sides of the elastic deck.
Figure 8:
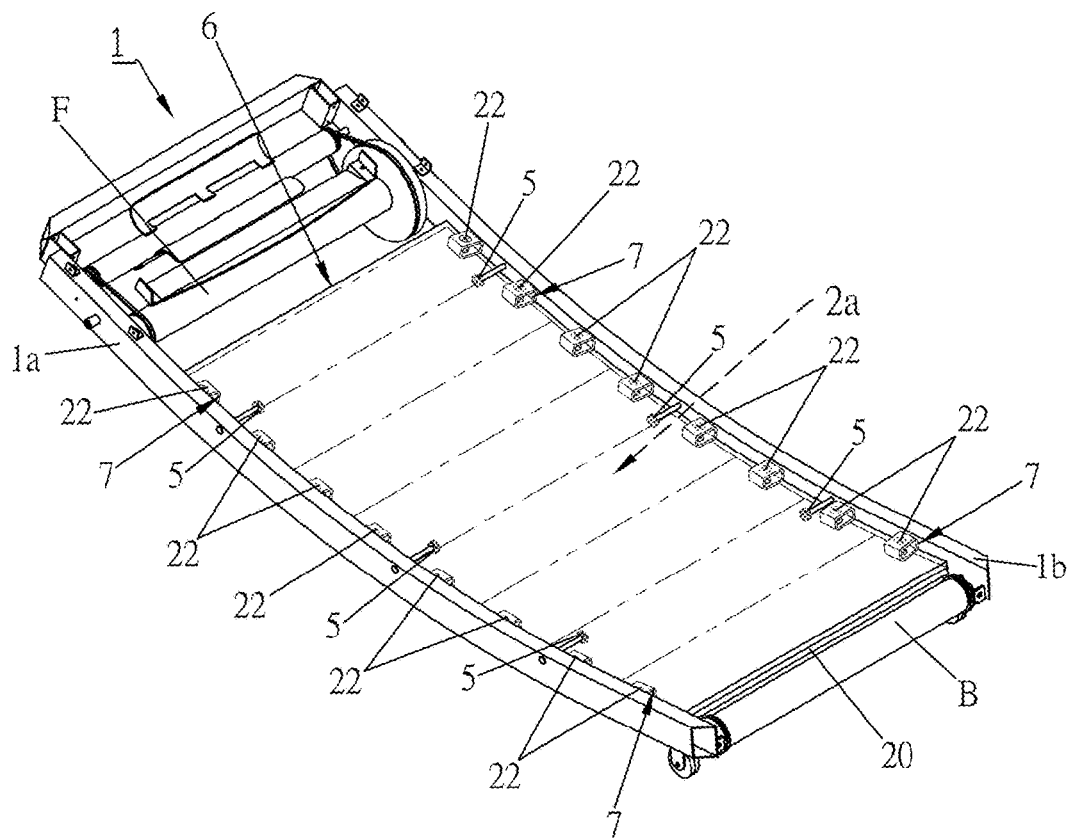
FIG. 8 is a perspective view of the curved treadmill deck of the present invention, showing the fixing members each in the form a tube or a plate to fix two sides of the elastic deck.

Furthermore, referring to FIG. 7 and FIG. 8, the treadmill 100 of the present invention may further include a plurality of fixing members 7. Each fixing member 7 may be a tube or a plate. The number of the fixing members 7 corresponds to the number of the perforations 21. The fixing members 7 correspond in position to the perforations 21, and are secured by the respective fixing pins 22 to press the outer side edges of the elastic deck 2 or the outer side edges of the respective sheets 20. This can prevent the outer edges of the elastic deck 2 from tilting up after being used for a long time.

Figure 9:
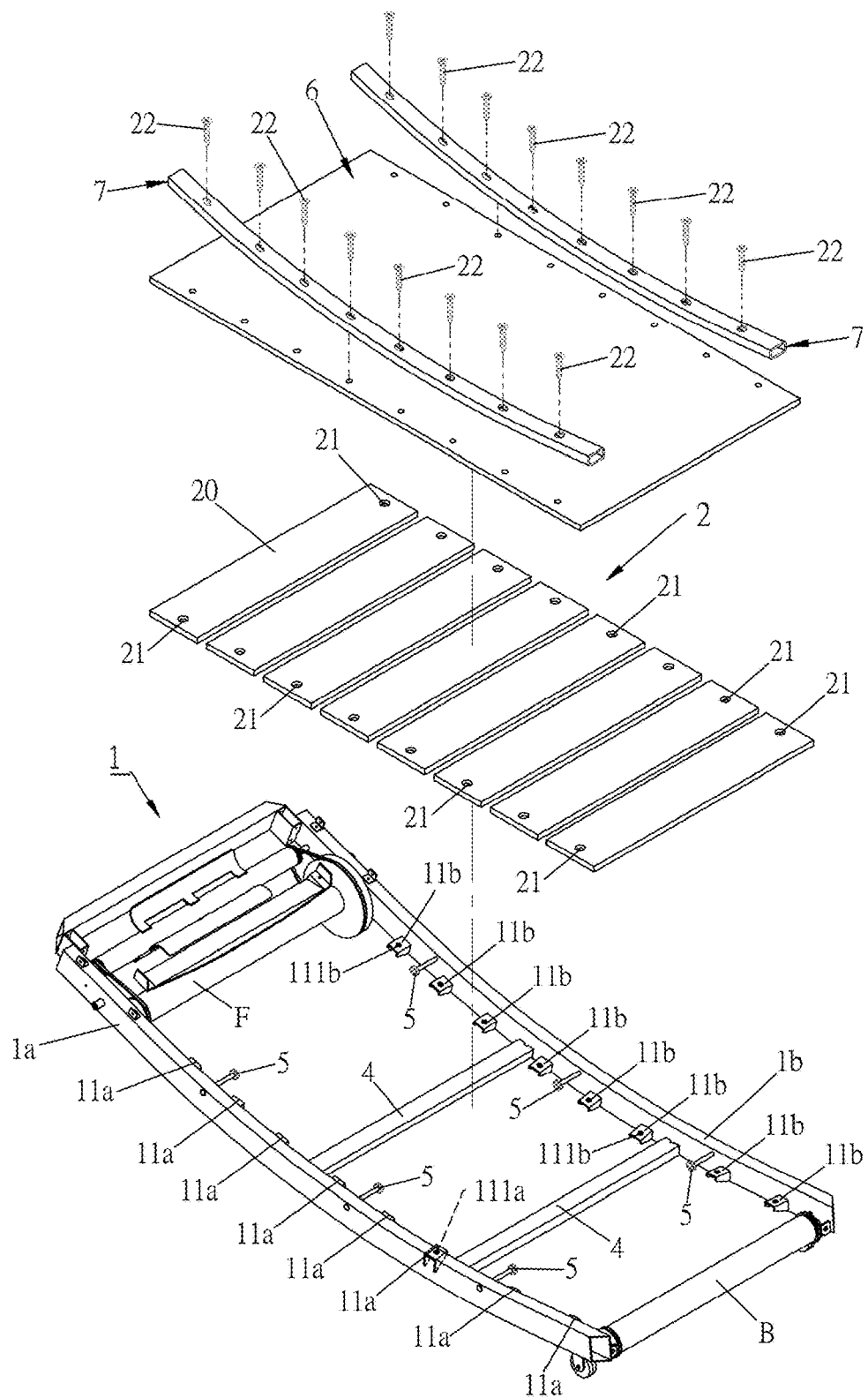
FIG. 9 is an exploded view of the curved treadmill deck of the present invention, showing the two fixing members each in the form an elongate curved tube or an elongate curved plate to fix two sides of the elastic deck.
Figure 10:
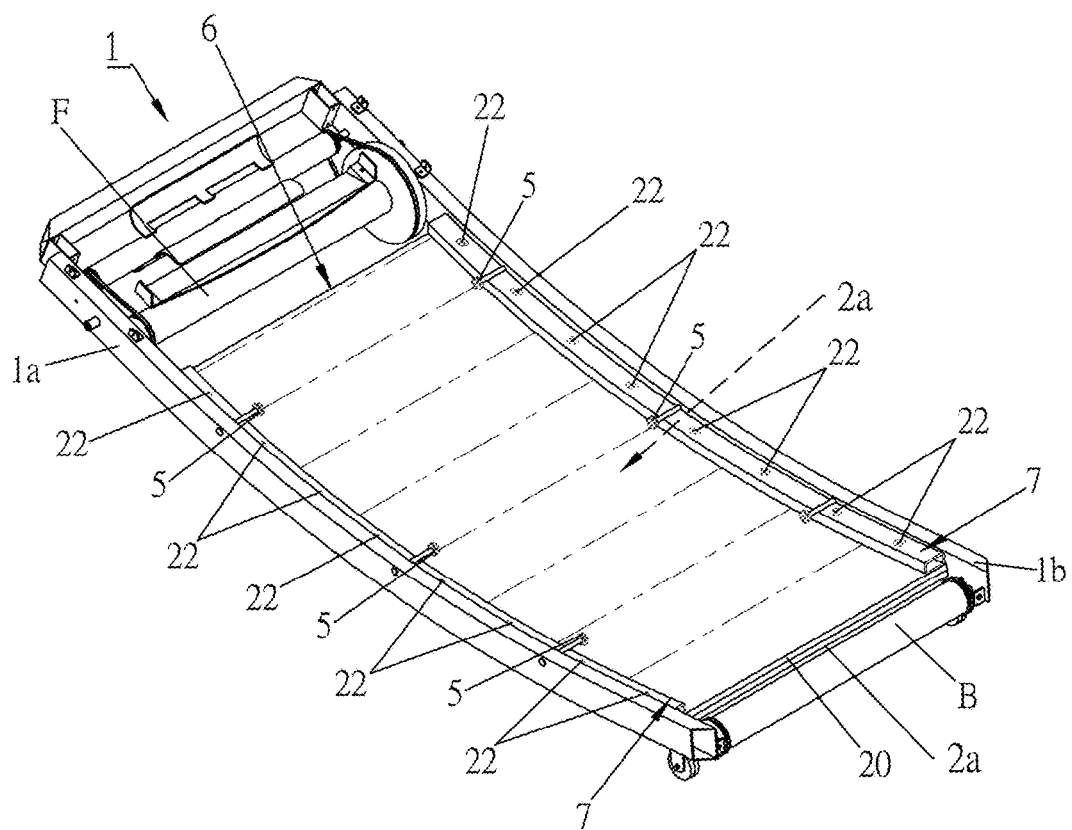
FIG. 10 is a perspective view of the curved treadmill deck of the present invention, showing the two fixing members each in the form an elongate curved tube or an elongate curved plate to fix two sides of the elastic deck.

Alternatively, referring to FIG. 9 and FIG. 10, the fixing member 7 may be an elongate curved tube or an elongate curved plate. The number of the fixing members 7 is two. The two fixing members 7 are located at two long sides of the elastic deck 2, that is, the fastening members 7 in the form of an elongate tube or an elongate plate are located corresponding to the perforations 21 of the elastic deck 2 and secured by the fixing pins 22 to press the outer side edges of the elastic deck 2 or the outer side edges of the respective sheets 20. This can prevent the outer edges of the elastic deck 2 from tilting up after being used for a long time.

Figure 11:
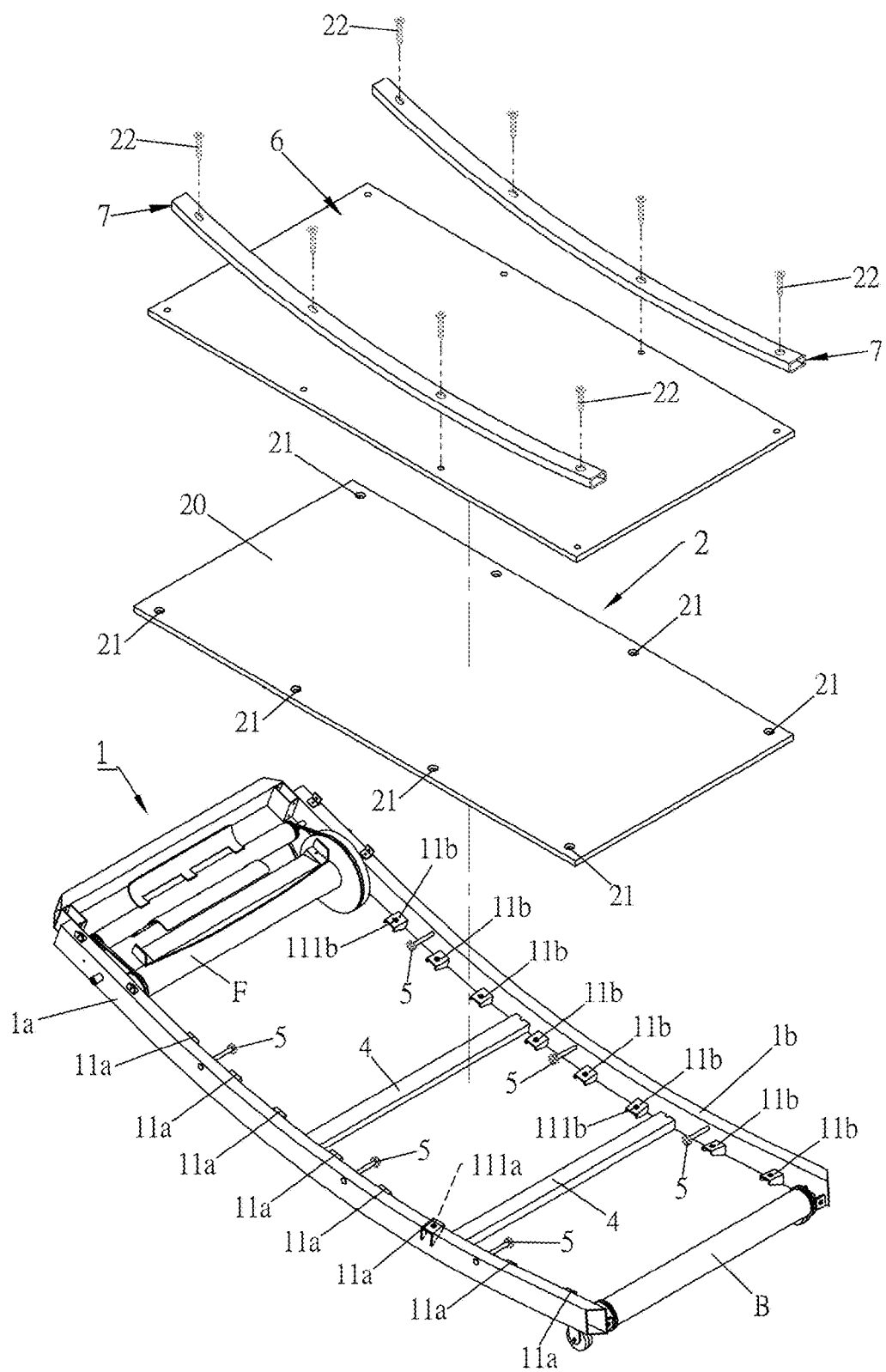
FIG. 11 is an exploded view of another embodiment of the curved treadmill deck of the present invention.
Figure 12:
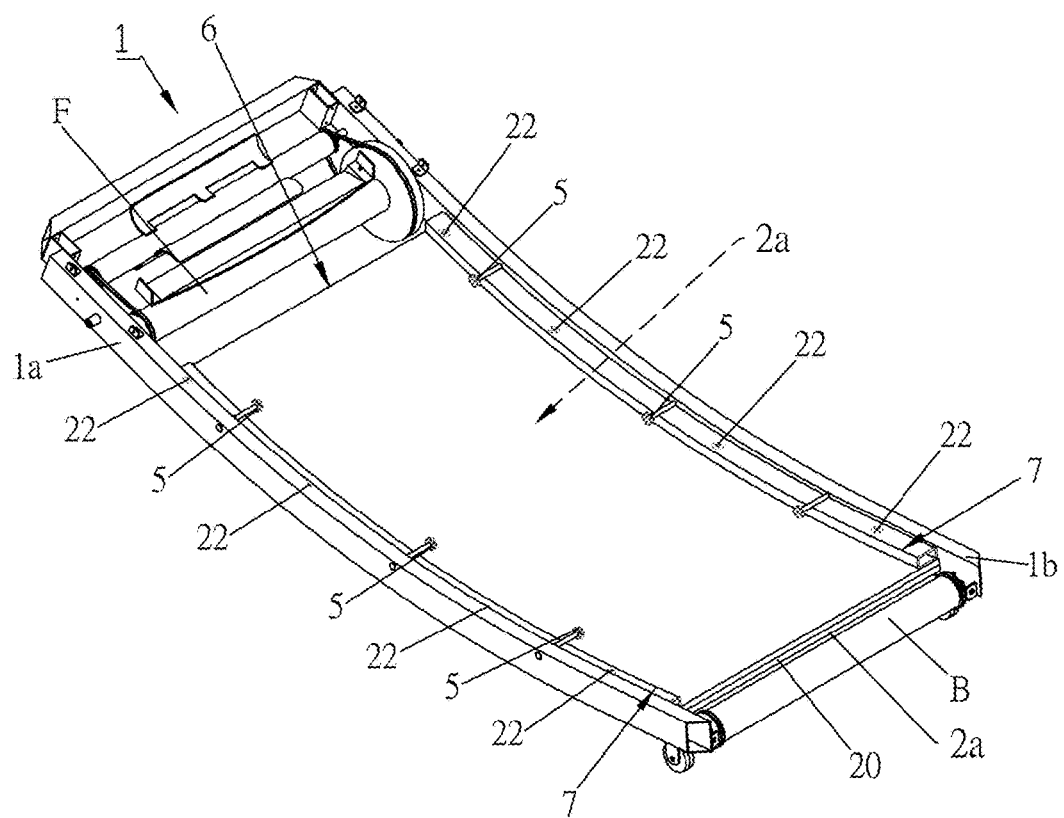
FIG. 12 is a perspective view of another embodiment of the curved treadmill deck of the present invention.

FIG. 11 and FIG. 12 illustrate the treadmill 100 according to another embodiment of the present invention, which is substantially similar to the former embodiment with the exceptions described hereinafter. In this embodiment, the elastic deck 2 is one-piece, and the endurable slide plate 6 is also one-piece. They can achieve the same effect as the aforesaid.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A treadmill having a curved treadmill deck, comprising:
   two curved side frames, disposed at two sides of a treadmill frame, the two curved side frames being parallel to each other and spaced apart from each other, the two curved side frames each having a high front end and a low rear end to form a curved shape, inner sides of the two curved side frames being provided with a plurality of fixing seats respectively, the fixing seats have fixing holes respectively, the fixing holes of the fixing seats of one curved side frame corresponding in position to the fixing holes of the fixing seats of the other curved side frame;
   an elastic deck, including a plurality of sheets connected side by side, the sheets each having perforations corresponding in position to the fixing holes of the respective fixing seats;
   a plurality of fixing pins, inserted in the perforations of the elastic deck and secured to the fixing holes of the fixing seats, the elastic deck being forcibly fastened by the fixing pins and slightly deformed according to the curved shape of the two curved side frames to form the curved treadmill deck; and
   an endurable slide plate, attached to the curved treadmill deck and fixed by the fixing pins, the endurable slide corresponds in shape to the curved treadmill deck.

2. The treadmill as claimed in claim 1, wherein the inner sides of the two curved side frames are provided with a plurality of press rods spaced apart from each other for pressing a treadmill belt on the curved treadmill deck so that the treadmill belt is attached to the curved treadmill deck; each press rod is one of a bearing and a roller, and an outer edge of each press rod is covered with a rubber soft layer or a plastic soft layer.

3. The treadmill as claimed in claim 1, wherein each sheet of the elastic deck is made of one of a flexible glass fiberboard, a flexible bamboo board, a flexible wood board, a flexible plastic board, and a flexible cardboard, and the sheets of the elastic deck are forcibly fastened by the respective fixing seats of the two curved side frames to form the curved treadmill deck.

4. The treadmill as claimed in claim 1, wherein each sheet of the elastic deck is made of one of a laminated wooden board, a laminated glass fiberboard, a laminated bamboo board, a laminated plastic board, and a laminated cardboard.

5. The treadmill as claimed in claim 1, wherein at least one support rod is transversely connected between the two curved side frames, and the support rod is located beneath the curved treadmill deck.

6. The treadmill as claimed in claim 1, further comprising a plurality of fixing members, each fixing member being one of a tube and a plate, the number of the fixing members corresponding to the number of the perforations, the fixing members corresponding in position to the perforations and being secured by the respective fixing pins to press outer side edges of the elastic deck.

7. The treadmill as claimed in claim 1, further comprising two fixing members, each fixing member being one of an elongate curved tube and an elongate curved plate, the two fixing members being located at two long sides of the elastic deck, the two fastening members corresponding to the perforations of the elastic deck and being secured by the fixing pins to press outer side edges of the elastic deck.

8. The treadmill as claimed in claim 1, wherein the endurable slide plate is a one-piece plate, and the endurable slide plate corresponding in size to the curved treadmill deck.

9. The treadmill as claimed in claim 1, wherein the endurable slide plate is composed of a plurality of plates connected side by side, and the plates of the endurable slide plate correspond in size and in position to the sheets of the elastic deck, respectively.

10. A treadmill having a curved treadmill deck, comprising:
    two curved side frames, disposed at two sides of a treadmill frame, the two curved side frames being parallel to each other and spaced apart from each other, the two curved side frames each having a high front end and a low rear end to form a curved shape, inner sides of the two curved side frames being provided with a plurality of fixing seats respectively, the fixing seats have fixing holes respectively, the fixing holes of the fixing seats of one of the two curved side frames corresponding to the fixing holes of the fixing seats of the other curved side frame;
    an elastic deck in the form of a single sheet, two sides of the elastic deck having perforations corresponding in position to the fixing holes of the respective fixing seats;
    a plurality of fixing pins, inserted in the perforations of the elastic deck and secured to the fixing holes of the fixing seats, the elastic deck being forcibly fastened by the fixing pins and slightly deformed according to the curved shape of the two curved side frames to form the curved treadmill deck; and
    an endurable slide plate, attached to the curved treadmill deck and fixed by the fixing pins, the endurable slide corresponds in shape to the curved treadmill deck.

* * * * *